(12) United States Patent
Murata

(10) Patent No.: US 8,133,605 B2
(45) Date of Patent: Mar. 13, 2012

(54) METHOD OF MANUFACTURING POWER STORAGE DEVICE

(75) Inventor: Takashi Murata, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 932 days.

(21) Appl. No.: 12/086,998

(22) PCT Filed: Oct. 22, 2007

(86) PCT No.: PCT/JP2007/070552
§ 371 (c)(1),
(2), (4) Date: Jun. 24, 2008

(87) PCT Pub. No.: WO2008/050720
PCT Pub. Date: May 2, 2008

(65) Prior Publication Data
US 2010/0221595 A1    Sep. 2, 2010

(30) Foreign Application Priority Data

Oct. 24, 2006  (JP) ................................ 2006-288180

(51) Int. Cl.
*H01M 4/00* (2006.01)
*H01M 2/00* (2006.01)
*H01M 6/00* (2006.01)
*H01M 2/18* (2006.01)
H01M 2/16 (2006.01)
H01M 2/14 (2006.01)
H01M 6/46 (2006.01)

(52) U.S. Cl. ........ 429/128; 429/129; 429/135; 429/146; 429/147; 429/148; 429/152; 29/623.1; 29/623.2

(58) Field of Classification Search .................... None
See application file for complete search history.

(56) References Cited

U.S. PATENT DOCUMENTS

| | | | |
|---|---|---|---|
| 6,174,337 B1 * | 1/2001 | Keenan .................. | 29/25.03 |
| 2004/0038123 A1 * | 2/2004 | Hisamitsu et al. ......... | 429/147 |
| 2004/0081860 A1 * | 4/2004 | Hundt et al. .............. | 429/7 |
| 2006/0159988 A1 * | 7/2006 | Kang et al. ............... | 429/156 |
| 2008/0090146 A1 * | 4/2008 | Batson .................... | 429/200 |
| 2010/0055558 A1 * | 3/2010 | Choi et al. ............... | 429/162 |

FOREIGN PATENT DOCUMENTS

| | | |
|---|---|---|
| JP | 2004-319362 A | 11/2004 |
| JP | 2005-011658 A | 1/2005 |
| JP | 2005-071784 | 3/2005 |
| JP | 2005-235428 A | 9/2005 |

* cited by examiner

*Primary Examiner* — In Suk Bullock
*Assistant Examiner* — Jennifer Wecker
(74) *Attorney, Agent, or Firm* — Kenyon & Kenyon LLP

(57) ABSTRACT

The invention provides a method of manufacturing a power storage device which enables facilitation of manufacturing of the power storage device while a plurality of terminal portions are prevented from overlapping one another when viewed from a stacking direction. The method of manufacturing the power storage device including a plurality of electrode elements stacked with electrolyte layers interposed between them, the method includes a first step of forming the electrode element which has a generally rotationally symmetric outer shape when viewed from a stacking direction and includes a terminal portion protruding in an outward direction of the power storage device in an area of the outer shape, and a second step of stacking the plurality of electrode elements formed in the first step with the electrolyte layers interposed between them at varying angles in a stacking plane such that the terminal portions do not overlap one another when viewed from the stacking direction.

15 Claims, 3 Drawing Sheets

METHOD OF MANUFACTURING POWER STORAGE DEVICE

This is a 371 national phase application of PCT/JP2007/070552 filed 22 Oct. 2007, claiming priority to Japanese Patent Application No. 2006-288180 filed 24 Oct. 2006, the contents of which are incorporated herein by reference.

TECHNICAL FIELD

The present invention relates to a method of manufacturing a power storage device including a plurality of electrode elements stacked with electrolyte layers interposed between them.

BACKGROUND ART

Some conventional secondary batteries are monitored for normal operation (function) by detecting a voltage between a positive electrode tab and a negative electrode tab provided for the secondary battery. Although this configuration can monitor the function of a layer-built battery consisting of a plurality of stacked unit cells, it cannot monitor the function of each unit cell.

To address this, a layer-built battery has been proposed in which each unit cell is provided with a voltage detecting tab for detecting a voltage at the unit cell (for example, see Patent Documents 1 to 3). Specifically, the voltage detecting tab is formed in a portion of a collector which constitutes part of each unit cell.

In layer-built batteries described in Patent Documents 1 and 2, a plurality of voltage detecting tabs are arranged not to overlap one another when viewed from a stacking direction. This arrangement is provided to prevent voltage detecting tabs adjacent to each other in the stacking direction from coming into contact and then being short-circuited.

[Patent Document 1] Japanese Patent Publication No. 2005-11658 (Paragraph No. [0022], FIGS. 2 and 6)

[Patent Document 2] Japanese Patent Publication No. 2005-235428 (FIGS. 17 and 18)

[Patent Document 3] Japanese Patent Publication No. 2004-319362 (FIGS. 1 and 3)

DISCLOSURE OF THE INVENTION

Problems to be Solved by the Invention

In the layer-built batteries described in Patent Documents 1 and 2, however, a plurality of types of collectors having the voltage detecting tabs located at different positions are used, which requires the collectors of different shapes to be formed. For example, if ten unit cells are stacked to constitute a layer-built battery, it is necessary to form a plurality of collectors with different shapes in accordance with the number of the unit cells.

When a plurality of collectors with different shapes are formed in this manner, the manufacturing cost of the layer-built battery is accordingly increased. In addition, since the plurality of collectors should be stacked in a predetermined order in the configurations of the layer-built batteries described in Patent Documents 1 and 2, the manufacturing process of the layer-built battery is complicated.

In view of the abovementioned problems, it is an object of the present invention to provide a method of manufacturing the power storage device which enables facilitation of manufacturing of a power storage device including a plurality of electrode elements stacked with electrolyte layers interposed between them.

Means for Solving Problems

According to an aspect, the present invention provides a method of manufacturing a power storage device including a plurality of electrode elements stacked with electrolyte layers interposed between them, the method including a first step of forming the electrode element which has a generally rotationally symmetric outer shape when viewed from a stacking direction and includes a terminal portion protruding in an outward direction of the power storage device in an area of the outer shape, and a second step of stacking the plurality of electrode elements formed in the first step with the electrolyte layers interposed between them, the electrode elements being placed at varying angles in a stacking plane such that the terminal portions of the electrode elements do not overlap one another when viewed from the stacking direction.

In the second step, the plurality of electrode elements may be stacked such that the plurality of terminal portions are placed along one direction on an outer circumference of the power storage device from one end to the other end of the power storage device in the stacking direction. The plurality of electrode elements may be stacked such that the plurality of terminal portions are arranged at generally regular interval when viewed from the stacking direction.

The electrode element may have the outer shape (outer shape except for the terminal portion) of a generally circular shape or a generally regular polygon when viewed from the stacking direction. The electrode element may have a collector including the terminal portion, and a positive electrode layer and a negative electrode layer formed on opposite surfaces of the collector, respectively.

The terminal portions of the electrode elements that are located at both ends of the power storage device in the stacking direction may be used for charge and discharge of the power storage device. The terminal portion of the electrode element that is located at a position other than both ends of the power storage device in the stacking direction may be used for detection of a voltage between the two electrode elements adjacent to each other in the stacking direction.

According to another aspect, the present invention provides a power storage device that includes a plurality of electrode elements each having a generally rotationally symmetric outer shape when viewed from a stacking direction and including a terminal portion protruding in an outward direction of the power storage device in an area of the outer shape, and an electrolyte layer placed between the electrode elements, wherein the plurality of electrode elements are stacked at varying angles in a stacking plane such that the terminal portions of the electrode elements do not overlap one another when viewed from the stacking direction.

The power storage device may further include a substrate placed along an outer circumference of the power storage device and including a plurality of wires for electrical connection to each of the terminal portions.

Effects of the Invention

According to the method of manufacturing the power storage device in the present invention, the plurality of electrode elements having the generally rotationally symmetric outer shape are used and stacked at the varying angles in the stacking plane, so that the plurality of terminal portions can be prevented from overlapping one another when viewed from the stacking direction. In addition, since the electrode elements with the same shape can be used, the manufacturing cost of the power storage device can be reduced.

BEST MODE FOR CARRYING OUT THE INVENTION

Preferred embodiments of the present invention will hereinafter be described.

[Embodiment 1]

Figure 1:
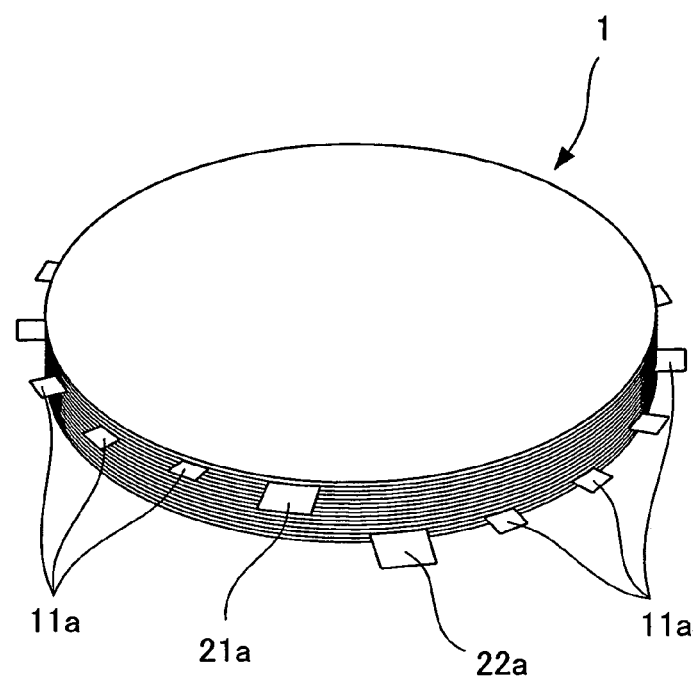
FIG. 1 is a perspective view showing the outer appearance of a secondary battery which is Embodiment 1 of the present invention.
Figure 2:
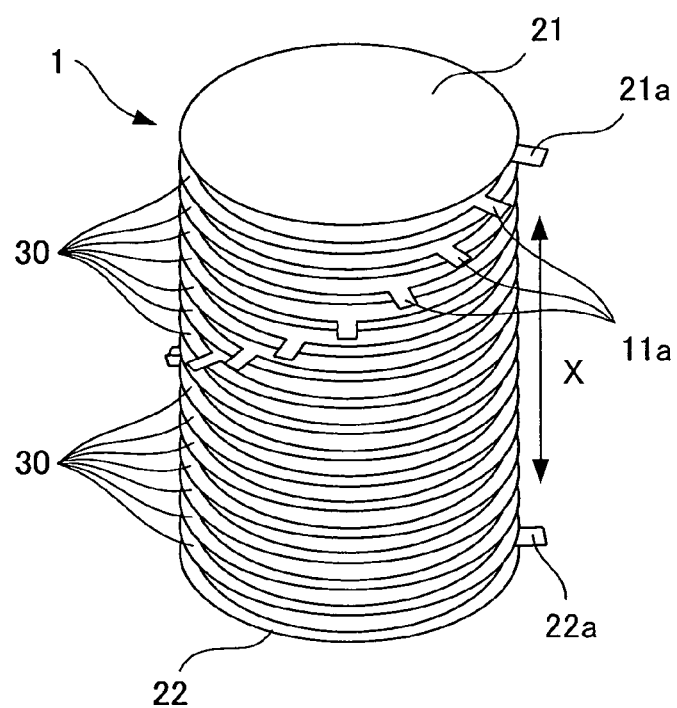
FIG. 2 is an exploded perspective view showing the secondary battery of FIG. 1.
Figure 3A:
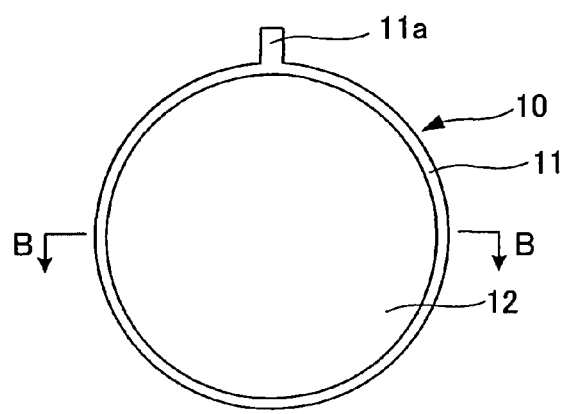
FIG. 3A is a front view showing the configuration of an electrode element in Embodiment 1.
Figure 3B:
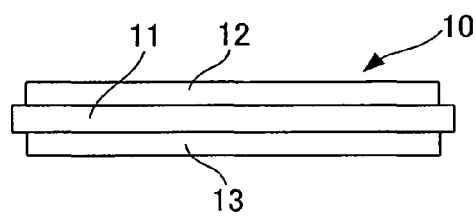
FIG. 3B is a section view showing the configuration of the electrode element of FIG. 3A.
Figure 4:
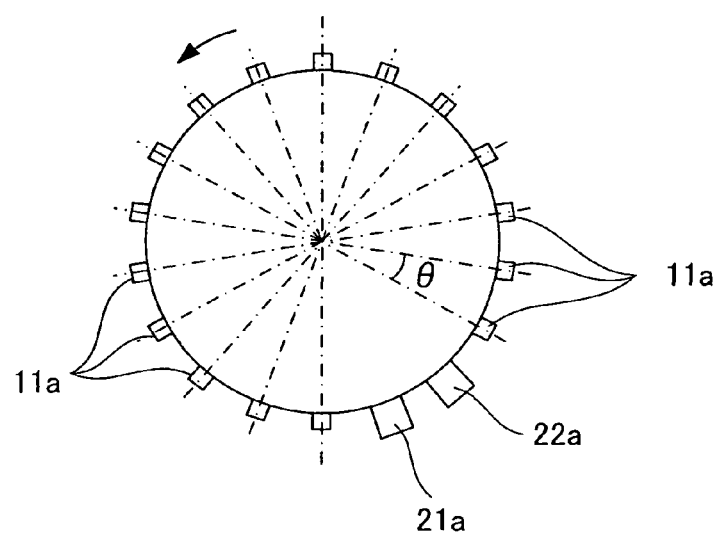
FIG. 4 is a diagram for explaining how to arrange stacked electrode elements in Embodiment 1.

A layer-built secondary battery (power storage device) which is Embodiment 1 of the present invention will hereinafter be described with reference to FIGS. 1 to 4. FIG. 1 is a perspective view showing the outer appearance of the secondary battery. FIG. 2 is an exploded perspective view showing the secondary battery. FIG. 3A is a front view showing a bipolar electrode for use in the secondary battery, and FIG. 3B is a section view showing the bipolar electrode. FIG. 4 is a diagram for explaining how to arrange stacked bipolar electrodes.

A secondary battery 1 of Embodiment 1 is formed by stacking bipolar electrodes (electrode elements) 10 shown in FIGS. 3A and 3B with electrolyte layers 30 interposed between them (see FIG. 2). As shown in FIG. 3B, the bipolar electrode 10 includes a collector 11, a positive electrode layer 12 on one surface of the collector 11, and a negative electrode layer 13 on the other surface opposite to the one surface of the collector 11. As shown in FIGS. 3A and 3B, the positive electrode layer 12 and the negative electrode layer 13 are formed within an area defined along the outer edge of the collector 11 (except for a voltage detecting tab 11a, later described).

FIG. 3A shows the one surface of the bipolar electrode 10, that is, surface on which the positive electrode layer 12 is formed. FIG. 3B shows a section taken along a line B-B in FIG. 3A.

The collector 11 can be formed of, for example, aluminum foil or a plurality of types of metal (alloy). The collector 11 can also be provided by covering a surface of metal with aluminum.

The collector 11 can be formed of a so-called composite collector consisting of a plurality of bonded metal foil sheets. When the composite collector is used, a positive electrode collector may be made of aluminum and a negative electrode collector may be made of nickel or copper, for example. The composite collector can include a positive electrode collector and a negative electrode collector in direct contact with each other or can include a conductive layer disposed between a positive electrode collector and a negative electrode collector.

Each of the electrode layers 12 and 13 contains an active material appropriate for the positive electrode or negative electrode. Each of the electrode layers 12 and 13 includes a conductive agent, a binder, a polyelectrolyte gel for increasing ionic conduction, a polyelectrolyte, and an additive as required. Known materials can be used for forming the electrode layers 12 and 13.

For a nickel metal hydride (NiMH) battery, by way of example, a nickel oxide can be used as the active material of the positive electrode layer 12, and a hydrogen storing alloy such as $MmNi_{(5-x-y-z)}Al_xMn_yCO_z$ (Mm: misch metal) can be used as the active material of the negative electrode layer 13.

For a lithium secondary battery, a lithium transition metal composite oxide can be used as the active material of the positive electrode layer 12, and carbon can be used as the active material of the negative electrode layer 13. As the conductive agent, acetylene black, carbon black, graphite, carbon fiber, and carbon nanotube can be used.

A solid electrolyte such as polymer solid electrolyte or inorganic solid electrolyte is used as the electrolyte layer 30. The electrolyte layer 30 is not limited to the solid electrolyte, and a gel or liquid electrolyte can be used, for example.

When the gel or liquid electrolyte is used, a seal member (not shown) needs to be placed between collectors 11 adjacent to each other in the stacking direction to prevent the electrolyte from leaking to the outside (outside of the secondary battery 1). In other words, the seal member and the collector 11 should be used to seal the space in which the electrolyte layer is contained.

While Embodiment 1 is described in conjunction with the bipolar secondary battery 1, the present invention is applicable to another secondary battery other than the bipolar type. A secondary battery other than the bipolar type may utilize an electrode element having electrode layers of the same type (positive electrode layer or negative electrode layer) formed on both sides of the collector 11 or an electrode element having an electrode layer only on one side of the collector 11.

While the secondary battery 1 is described in Embodiment 1, the present invention is applicable to a stacked capacitor (electric double layer capacitor) serving as a power storage device. The stacked capacitor is formed by alternately stacking a plurality of positive electrode elements and negative electrode elements with separators interposed between them, for example.

In such a stacked capacitor, aluminum foil can be used as the collector for the electrode element (positive electrode element or negative electrode element), activated carbon can be used as the positive electrode active material and the negative electrode active material, and porous film made of polyethylene can be used as the separator.

As shown in FIG. 3A, the collector 11 has a voltage detecting tab 11a which protrudes outward in the diameter direction of the collector 11. The area of the collector 11 except for the voltage detecting tab 11a is formed in a generally circular shape (including some allowable manufacturing errors).

The voltage detecting tab 11a is used to detect a voltage at a unit cell in the secondary battery 1 of Embodiment 1, in other words, a voltage between two bipolar electrodes 10 adjacent to each other in the stacking direction. The detection of the voltage at a unit cell enables the adjustment of the balance of capacity between that unit cell and other unit cells.

The unit cell refers to a power generation element including the positive electrode layer 12, the negative electrode layer 13, and the electrolyte layer 30 (see FIG. 2) sandwiched between the electrode layers 12 and 13.

On the other hand, each of electrode elements 21 and 22 located at each end of the secondary battery 1 in the stacking direction (see FIG. 2) has an electrode layer (positive electrode layer or negative electrode layer) formed on one surface of a collector. The collector of each of the electrode elements 21 and 22 has a positive electrode tab 21*a* or a negative electrode tab 22*a* which is formed integrally and protrudes outside in the diameter direction of the collector. The positive electrode tab 21*a* and the negative electrode tab 22*a* are used for charge and discharge of the secondary battery 1.

The area of the collector of the electrode element (positive electrode element) 21 except for the positive electrode tab 21*a* is formed in a generally circular shape (including some allowable manufacturing errors). The area of the collector of the electrode element (negative electrode element) 22 except for the negative electrode tab 22*a* is formed in a generally circular shape (including some allowable manufacture errors).

In Embodiment 1, the width of each of the positive electrode tab 21*a* and the negative electrode tab 22*a* (length in the circumferential direction of the secondary battery 1) is larger than the width (length in the circumferential direction of the secondary battery 1) of the voltage detecting tab 11*a*. The collectors of the electrode elements 21 and 22 differ from the collectors 11 of the bipolar electrodes 10 only in the shape of the tabs formed thereon, and the areas thereof except for the tabs have generally same shapes (generally circular shapes).

The tabs 21*a* and 22*a* and the tabs 11*a* may have generally same shapes. This configuration allows all of the collectors of the secondary battery 1 to be formed in the same shape. It is also possible that the collector of the electrode element 21 or 22 is not provided with the tab 21*a* or 22*a* and wire is connected to the end faces (end faces in the stacking direction) of those collectors. In this case, each of the electrode elements 21 and 22 is formed in a generally circular shape when viewed from the stacking direction.

As shown in FIG. 1, the secondary battery 1 of Embodiment 1 is formed in a generally cylindrical shape, and the plurality of voltage detecting tabs 11*a*, the positive electrode tab 21*a*, and the negative electrode tab 22*a* are placed on the outside surface (outer circumferential surface) of the cylindrical shape. The tabs 11*a*, 21*a*, and 22*a* are arranged not to overlap one another (see FIG. 4) when the secondary battery 1 is viewed from the stacking direction (direction X shown by an arrow in FIG. 2).

This arrangement of the tabs 11*a*, 21*a*, and 22*a* can prevent the tabs provided at different positions in the stacking direction from coming into contact with each other and then being short-circuited.

Next, a method of manufacturing the bipolar electrode 10 of Embodiment 1 will be described.

First, a roll of sheet (metal foil) for forming the collector 11 is prepared. The positive electrode layer 12 is applied to one surface of the roll, while the negative electrode layer 13 is applied to the other surface. Specifically, the positive electrode layer 12 and the negative electrode layer 13 can be formed on the surfaces of the collector 11 by using a known coater application method or an ink-jet application method, for example.

Next, the collector having the positive electrode layer 12 and the negative electrode layer 13 formed thereon is shaped into the shape shown in FIG. 3A through press forming, for example. This results in the bipolar electrode 10 of Embodiment 1. Each of the electrode elements 21 and 22 located at each end of the secondary battery 1 is formed by applying the positive electrode layer or the negative electrode layer on one surface of the collector and then performing press forming or the like.

Next, a method of manufacturing the secondary battery 1 of Embodiment 1 will be described.

First, the electrolyte layer 30 is put on the negative electrode element 22 having the negative electrode tab 22*a*, and the bipolar electrode 10 having the voltage detecting tab 11*a* is put on that electrolyte layer 30. Then, the electrolyte layer 30 is put on that bipolar electrode 10 and another bipolar electrode 10 is put thereon. The electrolyte layers 30 and the bipolar electrodes 10 are alternately placed in this manner until a predetermined number of electrolyte layers 30 and bipolar electrodes 10 are stacked. Thereafter, the positive electrode element 21 having the positive electrode tab 21*a* is put thereon.

In stacking two bipolar electrodes 10 with the electrolyte layer 30 interposed between them, they are arranged such that the electrolyte layer 30 is sandwiched between the positive electrode layer 12 of one of the two bipolar electrodes 10 and the negative electrode layer 13 of the other bipolar electrode 10.

The plurality of bipolar electrodes 10 and the electrode elements 21 and 22 are stacked by placing them at different stacking angles (phases) such that the tabs 11*a*, 21*a*, and 22*a* do not overlap one another when the secondary battery 1 is viewed from the stacking direction. More specific description will hereinafter be made of how to stack them with reference to FIG. 4.

First, the bipolar electrode 10 is stacked over the negative electrode element 22 with the electrolyte layer 30 interposed between them such that the voltage detecting tab 11*a* of the bipolar electrode 10 is shifted in one circumferential direction of the secondary battery 1 (direction shown by an arrow in FIG. 4) with respect to the position of the negative electrode tab 22*a* of the negative electrode element 22. In other words, the bipolar electrode 10 is stacked such that the voltage detecting tab 11*a* thereof is shifted by a predetermined angle with respect to the negative electrode tab 22*a* when the secondary battery 1 is viewed from the stacking direction.

Since the collectors have the circular shapes which are generally rotationally symmetric and generally same shape except for the tabs 22*a* and 11*a*, the bipolar electrode 10 except for the voltage detecting tab 11*a* overlies (coincides with) the negative electrode element 22 except for the negative electrode tab 22*a* when viewed from the stacking direction. This applies to the stacking of the positive electrode element 21.

Then, for stacking another bipolar electrode 10 over the stacked bipolar electrode 10 with the electrolyte layer 30 interposed between them, the voltage detecting tab 11*a* of the bipolar electrodes 10 to be stacked is shifted in the one circumferential direction of the secondary battery 1 (direction shown by the arrow in FIG. 4) with respect to the position of the voltage detecting tab 11*a* of the stacked bipolar electrode 10*a*. In other words, the bipolar electrodes 10 are stacked such that the voltage detecting tab 11*a* to be stacked is shifted by a predetermined angle with respect to the stacked voltage detecting tab 11*a* when the secondary battery 1 is viewed from the stacking direction.

Since the bipolar electrodes 10 have circular shapes which are generally rotationally symmetric and generally same shape except for the voltage detecting tabs 11*a* when viewed from the stacking direction, the two bipolar electrodes 10 overlap (coincide) each other except for the voltage detecting tabs 11*a* when viewed from the stacking direction.

In Embodiment 1, as shown in FIG. 4, the plurality of voltage detecting tabs 11a are arranged at regular intervals of a predetermined angle θ when viewed from the stacking direction. The predetermined angle θ can be set as appropriate. For example, the predetermined angle θ can be set to a value calculated by dividing the outer circumference (360 degrees) of the bipolar electrode 10 (secondary battery 1) by the number of the stacked bipolar electrodes 10 and electrode elements 21 and 22, in other words, the number of the tabs 11a, 21a, and 22a.

The arrangement of the plurality of tabs 11a, 21a, and 22a at the regular intervals when the secondary battery 1 is viewed from the stacking direction can ensure the intervals between the adjacent tabs 11a and the like in the stacking direction to prevent the tabs 11 and the like at the different positions from coming into contact with each other and then being short-circuited.

While the tabs 11a, 21a, and 22a are placed at the regular intervals when the secondary battery 1 is viewed from the stacking direction in Embodiment 1, the tabs may not be arranged at regular intervals. In other words, the tabs 11a, 21a, and 22a adjacent to each other in the circumferential direction of the secondary battery 1 may be placed at various intervals when viewed from the stacking direction.

In Embodiment 1, the tabs 11a, 21a, and 22a can be disposed at the different positions when the secondary battery 1 is viewed from the stacking direction only by stacking the bipolar electrodes 10 and the like at the varying stacking angles (phases). Since the bipolar electrode 10 except for the tab 11a and the electrode elements 21 and 22 except for the tabs 21a and 22a are formed in the generally circular shape which is rotationally symmetric, the stacked bipolar electrodes 10 and electrode elements 21 and 22 can overlap one another even when the stacking angle is varied.

This configuration eliminates the need to form electrode elements having tabs at different positions in accordance with position in the stacking direction as in conventional secondary batteries described above, so that the secondary battery 1 can be manufactured with the bipolar electrodes 10 and the like with the same shape. When the bipolar electrodes 10 and the like with the same shape can be used, the manufacturing cost of the secondary battery 1 can be reduced as compared with the case where bipolar electrodes and the like having different shapes are formed.

In the conventional secondary batteries, a plurality of electrode elements having different shapes should be stacked in a predetermined order. In the secondary battery 1 of Embodiment 1, however, the bipolar electrodes 10 and the like do not need to be stacked in a predetermined order since they have the same shape. This facilitates the manufacturing of the secondary battery 1. In addition, the productivity of the secondary battery 1 can be improved.

Figure 5:
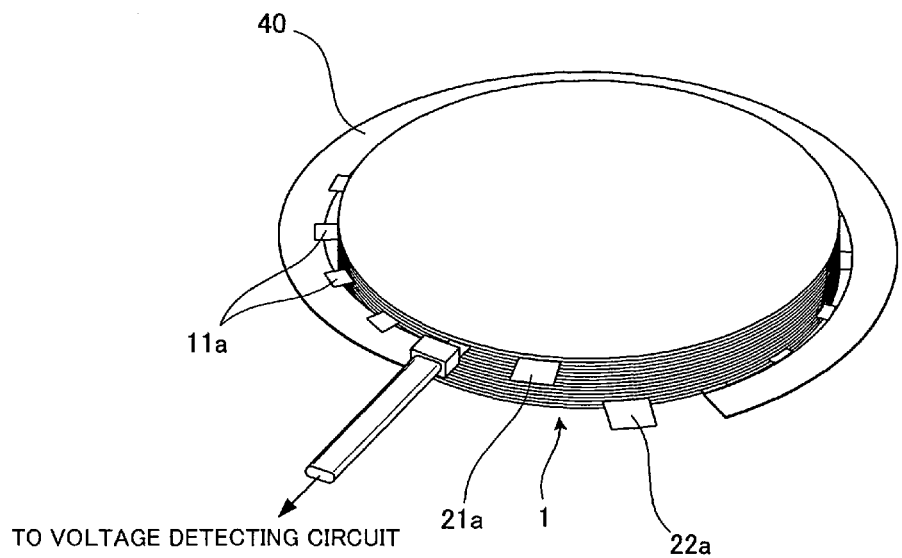
FIG. 5 is a diagram showing a configuration for taking an output from the secondary battery in Embodiment 1.
Figure 6:
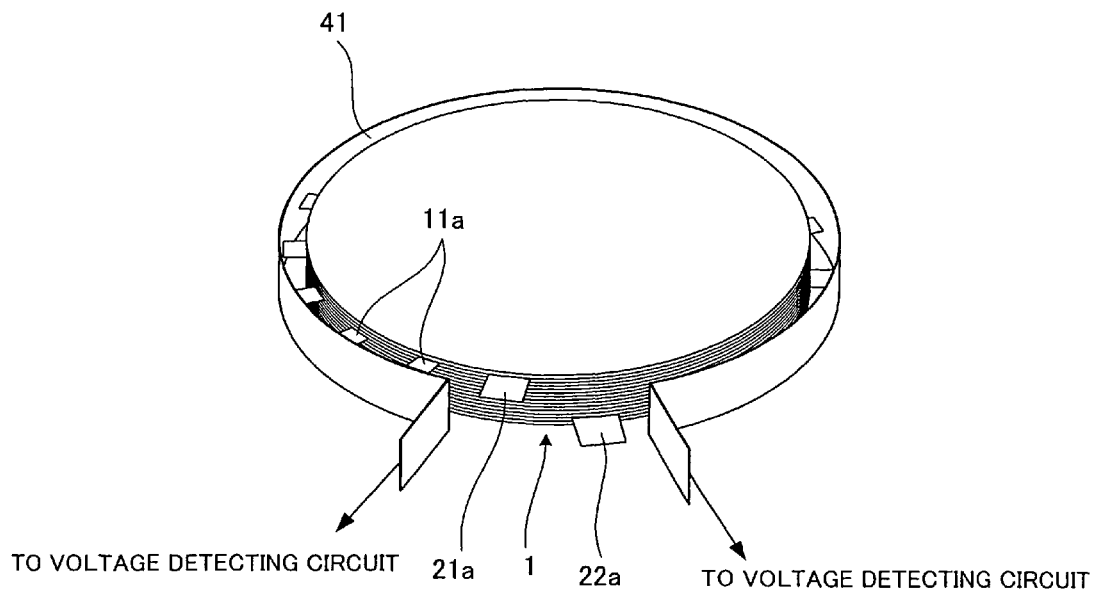
FIG. 6 is a diagram showing another configuration for taking an output from the secondary battery in Embodiment 1.

Next, configurations for taking an output from the secondary battery 1 of Embodiment 1 will be described with reference to FIGS. 5 and 6. FIG. 5 is a schematic diagram showing a first configuration for taking an output from the secondary battery, while FIG. 6 is a schematic diagram showing a second configuration for taking an output from the secondary battery.

The first configuration differs from the second configuration in the structure of a flexible substrate connected electrically and mechanically to the voltage detecting tabs 11a of the secondary battery 1.

First, the first configuration will be described.

As shown in FIG. 5, a flexible substrate 40 is placed along the outer circumference of the secondary battery 1 and has a plurality of wires (not shown) for connection to the respective voltage detecting tabs 11a. In other words, the flexible substrate 40 has as many wires as the voltage detecting tabs 11a.

A terminal portion (not shown) is provided for the end portion of each of the wires and is electrically and mechanically connected to the corresponding voltage detecting tab 11a. The terminal portion and the voltage detecting tab 11a can be connected to each other with a conductive adhesive or with anisotropic conductive film interposed between them.

Some of the voltage detecting tabs 11a are connected to one surface of the flexible substrate 40, while the other voltage detecting tabs 11a are connected to the other surface of the flexible substrate 40.

The terminal portions of the wires provided for the flexible substrate 40 that are connected to the abovementioned some voltage detecting tabs 11a are exposed on the one surface of the flexible substrate 40. The other terminal portions of the wires that are connected to the abovementioned other voltage detecting tabs 11a are exposed on the other surface of the flexible substrate 40.

As shown in FIG. 5, one end of the flexible substrate 40 is bent into a cylindrical shape and is connected to a voltage detecting circuit (not shown). This allows the voltage detecting circuit to detect the voltage at each unit cell.

Next, the second configuration will be described. As shown in FIG. 6, the second configuration includes a flexible substrate 41 placed along the outer circumference of the secondary battery 1, and the inner circumferential surface of the flexible substrate 41 is connected to the end of each of the voltage detecting tabs 11a.

Similar to the flexible substrate 40 shown in FIG. 5, the flexible substrate 41 includes a plurality of terminal portions (not shown) for electrical and mechanical connection to the respective voltage detecting tabs 11a and a plurality of wires (not shown) connected to the terminal portions. The terminal potions are exposed on the inner circumferential surface (surface closer to the secondary battery 1) of the flexible substrate 41.

The terminal portion and the voltage detecting tab 11a can be connected to each other with a conductive adhesive or with anisotropic conductive film interposed between them.

A control circuit (not shown) can control a charge voltage and a discharge voltage for each of the unit cells based on the voltage output to the voltage detecting circuit (not shown) through the flexible substrate 40 or 41. In other words, the control circuit can detect the voltage at each unit cell through the voltage detecting circuit and adjust the electric current during charge and discharge for each of the unit cells based on the detected voltage.

The configuration for electrically connecting the plurality of voltage detecting tabs 11a to the voltage detecting circuit is not limited to those shown in FIGS. 5 and 6. It is possible to use any configuration which can electrically and mechanically connect a wire to each of the voltage detecting tabs 11a to detect the voltage at each unit cell. The plurality of wires included in the single flexible substrate 40 or 41 as in Embodiment 1 can simplify the configuration for detecting the voltage at each unit cell.

While Embodiment 1 has been described for the case where the bipolar electrode 10 except for the voltage detecting tab 11a and the electrode elements 21 and 22 except for the tabs 21a and 22a have the generally circular shapes, the present invention is not limited thereto. Specifically, the bipolar electrode 10 and the electrode elements 21 and 22 except for the tabs 11a, 21a, and 22a, respectively, can be formed in a generally regular polygon (including some allowable manufacturing errors). It is essential only that the shape is rotationally symmetric when viewed from the stacking direction, and the shape is not limited to the polygon.

With the bipolar electrodes and the like formed in a generally regular polygon which is rotationally symmetric except for the tabs when viewed from the stacking direction, those bipolar electrodes and the like can be stacked at varying stacking angles (phases) to realize the arrangement in which the plurality of tabs do not overlap one another when viewed from the stacking direction. In addition, the bipolar electrodes and the like except for the tabs can be stacked such that they overlap (coincide) one another when viewed from the stacking direction.

When the bipolar electrodes and the like having a generally regular polygon shape are used, the stacking angle (corresponding to the angle θ in FIG. 4) of the bipolar electrodes and the like depends on the angle determined by one side of the regular polygon.

Any regular polygon may be used. However, a regular polygon close to a circular shape is preferably used to prevent contact between the tabs and to place the tabs efficiently over the entire outer circumferential surface of the secondary battery.

As shown in FIG. 4, the plurality of tabs 11a, 21a, and 22a are disposed within one round of the outer circumferential surface of the secondary battery 1 in Embodiment 1, but the present invention is not limited thereto. For example, the bipolar electrodes 10 and the like may be stacked such that the plurality of tabs 11a, 21a, and 22a are placed along a spiral path on the outer circumferential surface of the secondary battery 1.

The secondary battery 1 of Embodiment 1 can be used as a power storage device for driving a motor in an electric vehicle (EV), a hybrid electric vehicle (HEV), and a fuel cell vehicle (FCV), for example.

The invention claimed is:

1. A method of manufacturing a power storage device comprising a plurality of electrode elements stacked with electrolyte layers interposed between them, the method comprising:
   a first step of forming a plurality of electrode elements, wherein all of the plurality of electrode elements have a rotationally symmetric outer shape when viewed from a stacking direction and includes a terminal portion protruding in an outward direction of the power storage device in an area of the outer shape; and
   a second step of stacking the plurality of electrode elements provided in the first step with the electrolyte layers interposed between them, the electrode elements being placed at varying rotational angles in a stacking plane such that the terminal portions of the electrode elements do not overlap one another when viewed from the stacking direction.

2. The method according to claim 1, wherein, in the second step, the plurality of electrode elements are stacked such that the plurality of terminal portions are placed along one direction on an outer circumference of the power storage device from one end to the other end of the power storage device in the stacking direction.

3. The method according to claim 1, wherein, in the second step, the plurality of electrode elements are stacked such that the plurality of terminal portions are arranged at generally regular interval when viewed from the stacking direction.

4. The method according to claim 1, wherein each electrode element has the outer shape of a generally circular shape or a generally regular polygon when viewed from the stacking direction.

5. The method according to claim 1, wherein each electrode element includes a collector including the terminal portion, and a positive electrode layer and a negative electrode layer which are formed on opposite surfaces of the collector, respectively.

6. The method according to claim 1, wherein the terminal portions of the electrode elements that are located at each end of the power storage device in the stacking direction are used for charge and discharge of the power storage device.

7. The method according to claim 1, wherein the terminal portion of each electrode element that is located at a position other than both ends of the power storage device in the stacking direction is used for detection of a voltage between the two electrode elements adjacent to each other in the stacking direction.

8. A power storage device comprising:
   a plurality of electrode elements each having a rotationally symmetric outer shape when viewed from a stacking direction and including a terminal portion protruding in an outward direction of the power storage device in an area of the outer shape; and
   an electrolyte layer placed between the plurality of electrode elements,
   wherein the plurality of electrode elements are stacked at varying rotational angles in a stacking plane such that the terminal portions of the electrode elements do not overlap one another when viewed from the stacking direction.

9. The power storage device according to claim 8, further comprising a substrate placed along an outer circumference of the power storage device and including a plurality of wires for electrical connection to each of the terminal portions.

10. A power storage device comprising:
    a plurality of electrode elements, each electrode element including a terminal portion protruding in an axial direction, wherein all of the electrode elements have the same shape;
    wherein the plurality of electrode elements are stacked vertically,
    wherein the terminal portions of the electrode elements are rotated about the vertical axis with respect to each other; and
    an electrolyte layer placed between each of the plurality of electrode elements.

11. The power storage device of claim 10, wherein none of the terminal portions overlap when viewed from above.

12. The power storage device of claim 10, wherein the electrode elements have a circular outer shape with a protruding tab.

13. The power storage device of claim 10, wherein each electrode element is rotated about the vertical axis at an angle different from each of the other electrode elements.

14. The power storage device of claim 10, wherein the terminal portions are evenly spaced around an outer surface of the electrode elements.

15. The power storage device of claim 10, wherein each terminal portion is rotated at an angle A with respect to the terminal portion of the adjacent electrode element.

* * * * *